(12) United States Patent
Chang

(10) Patent No.: US 10,873,528 B2
(45) Date of Patent: Dec. 22, 2020

(54) PACKET FORWARDING METHOD AND DEVICE UTILIZING THE SAME

(71) Applicant: NANNING FUGUI PRECISION INDUSTRIAL CO., LTD., Nanning (CN)

(72) Inventor: Chih-Chin Chang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 4 days.

(21) Appl. No.: 16/199,173

(22) Filed: Nov. 24, 2018

(65) Prior Publication Data

US 2020/0169506 A1 May 28, 2020

(51) Int. Cl.
| | |
|---|---|
| *H04L 29/06* | (2006.01) |
| *H04L 12/741* | (2013.01) |
| *H04L 12/46* | (2006.01) |
| *H04L 12/721* | (2013.01) |
| *H04L 12/715* | (2013.01) |
| *H04L 12/725* | (2013.01) |
| *H04L 12/851* | (2013.01) |
| *H04N 21/466* | (2011.01) |
| *H04W 40/00* | (2009.01) |

(52) U.S. Cl.
CPC ........ *H04L 45/745* (2013.01); *H04L 12/4633* (2013.01); *H04L 29/06523* (2013.01); *H04L 45/306* (2013.01); *H04L 45/38* (2013.01); *H04L 45/54* (2013.01); *H04L 45/64* (2013.01); *H04L 69/22* (2013.01); *H04L 47/2441* (2013.01); *H04L 2212/00* (2013.01); *H04N 21/4665* (2013.01); *H04W 40/00* (2013.01)

(58) Field of Classification Search
CPC .............. H04B 1/0003; H04L 12/2417; H04L 29/06843; H04L 67/2833; H04L 29/06523; H04N 21/4665; H04W 40/00
See application file for complete search history.

(56) References Cited

U.S. PATENT DOCUMENTS

| | | | |
|---|---|---|---|
| 2016/0119253 A1* | 4/2016 | Kang | H04L 67/2814 370/228 |
| 2017/0093658 A1 | 3/2017 | Ryan et al. | |
| 2018/0255152 A1* | 9/2018 | Jeuk | H04L 67/28 |

FOREIGN PATENT DOCUMENTS

| | | |
|---|---|---|
| CN | 105337852 | 2/2016 |
| CN | 106302206 | 1/2017 |

\* cited by examiner

*Primary Examiner* — Salvador E Rivas
(74) *Attorney, Agent, or Firm* — ScienBiziP, P.C.

(57) ABSTRACT

A packet forwarding method. The method reacts to service function events promptly by recalculating a more streamlined service function path (SFP) for a packet flow of a service function chain (SFC). Service functions (SFs) and service function forwarders (SFFs) collaborate to serve a SFC packet flow and bypass SFs belonging to the same SF group which does not provides functional service to packets of the flow.

4 Claims, 8 Drawing Sheets

PACKET FORWARDING METHOD AND DEVICE UTILIZING THE SAME

BACKGROUND

1. Technical Field

The disclosure relates to computer techniques, and more particularly to service function chain (SFC) packet forwarding.

2. Description of Related Art

Network function virtualization (NFV) is becoming a key driver and architecture in many large enterprise networks. Generally, NFV realizes virtualization of certain network functions that would traditionally be implemented as separate network appliances, such as firewalls, accelerators, intrusion detection, load balances and others.

NFV implementations increasingly employ service function chains to control which functions or services are applied to network traffic. Service function chaining enables virtualized networking functions to be implemented as part of a cloud network. A service function chain defines an ordered list of a plurality of service functions that may be applied to packet flows in the network. A packet flow enters the network through a classifier node that generates a service function path for that flow according to the service function chain policy. The classifier node encapsulates each packet of the flow with a network service header that indicates the service functions to which the flow will be subjected, and the order the service functions will be applied.

Even if a sequence of service functions have been allocated for a packet flow, some of the allocated service functions may bypass processing packets in the packet flow. For example, a network function for transmission control protocol (TCP) processing may bypass processing user datagram protocol (UDP) packets in a packet flow. Repeatedly routing UDP packets to a TCP network function and bypassing processing is inefficient.

DETAILED DESCRIPTION

The disclosure provides a packet forwarding method for network function virtualization (NFV) and service function chain (SFC). In response to a bypass event in which a packet of a flow belonging to a service function path (SFP) is forwarded to a service function (SF) but processing of the packet by the SF is determined to be bypassed, components in the service function path cooperate to recalculate a streamlined path for packets of the flow. For example, a SFP includes a plurality of SFs including an i-th SF, a j-th SF, and a k-th SF, wherein i, j, and k are integers and i>j>k. A service function forwarder (SFF) in the SFP upon detecting that a i-th SF bypasses processing of a packet of the SFP, the SFF, rather than forwarding the packet to a j-th SF grouped with i-th SF in the SFP, directly forwards the packet to a k-th SF in the SFP. The packet thus bypass the j-th SF and a j-th SFF associated with the j-th SF. Components in the SFP may further cooperate to facilitate packets of the SFP bypass more SFs and SFFs that share the same group of the i-th SF.

Figure 1:
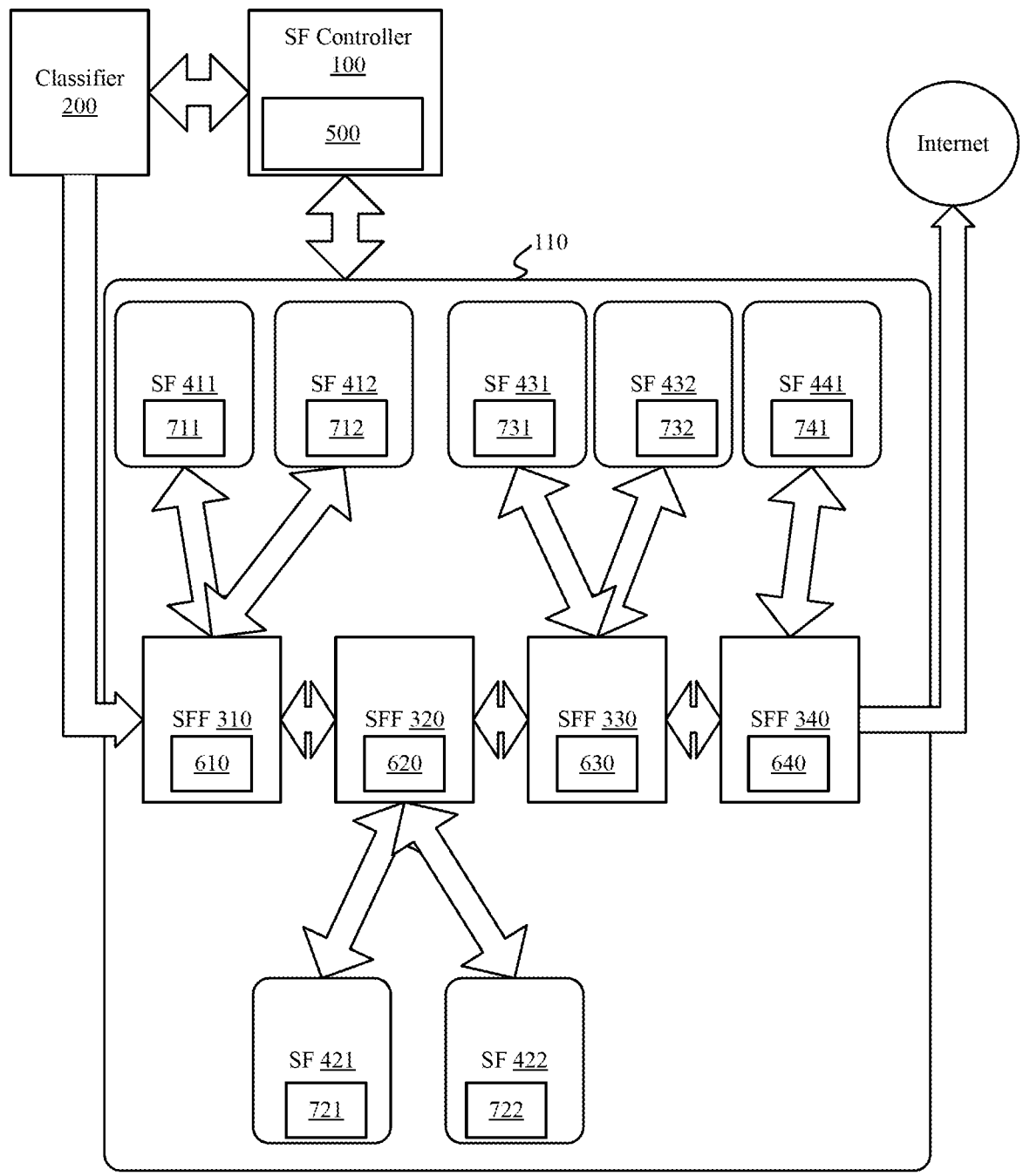
FIG. 1 is a block diagram of an exemplary embodiment of a SFC of the disclosure.

With reference to FIG. 1, a SFC controller 100 is connected to a SFC classifier 200 and a SF set 110. A classifier is an element that performs classification function. An exemplary definition of classification function may be referred to in Internet Engineering Task Force (IETF) RFC 7665. The SFC classifier 200 may initiate a SFP as an instance of a service function chain (SFC). A SFP is a mechanism used by service chaining to express the result of applying more granular policy and operational constraints to the abstract requirements of a SFC. In the SF set 110, a SFC classifier 200 is connected to SFFs 310, 320, 330, and 340. The SFF 310 is connected to SFs 411 and 412. The SFF 320 is connected to SFs 421 and 422. The SFF 330 is connected to SFs 431 and 432. The SFF 340 is connected to a SF 441.

The SFC controller 100 includes a grouping module (GM) 500 operable to distribute definition of one or more SF groups. The SFC controller 100 may comprise an exemplary embodiment of a heterogeneous control/policy point as described in RFC 7665. The SFs 411, 412, 421, 422, 431, 432, and 441 respectively comprise sensitive detector module (SDM) 711, 712, 721, 722, 731, 732, and 741. The SFFs 310, 320, 330, and 340 respectively includes path recalculation module (PRM) 610, 620, 630, and 640. Each of the GM 500, SDM 711, 712, 721, 722, 731, 732, 741, PRM 610, 620, 630, and 640 may be installed as a plug-in.

Figure 2:
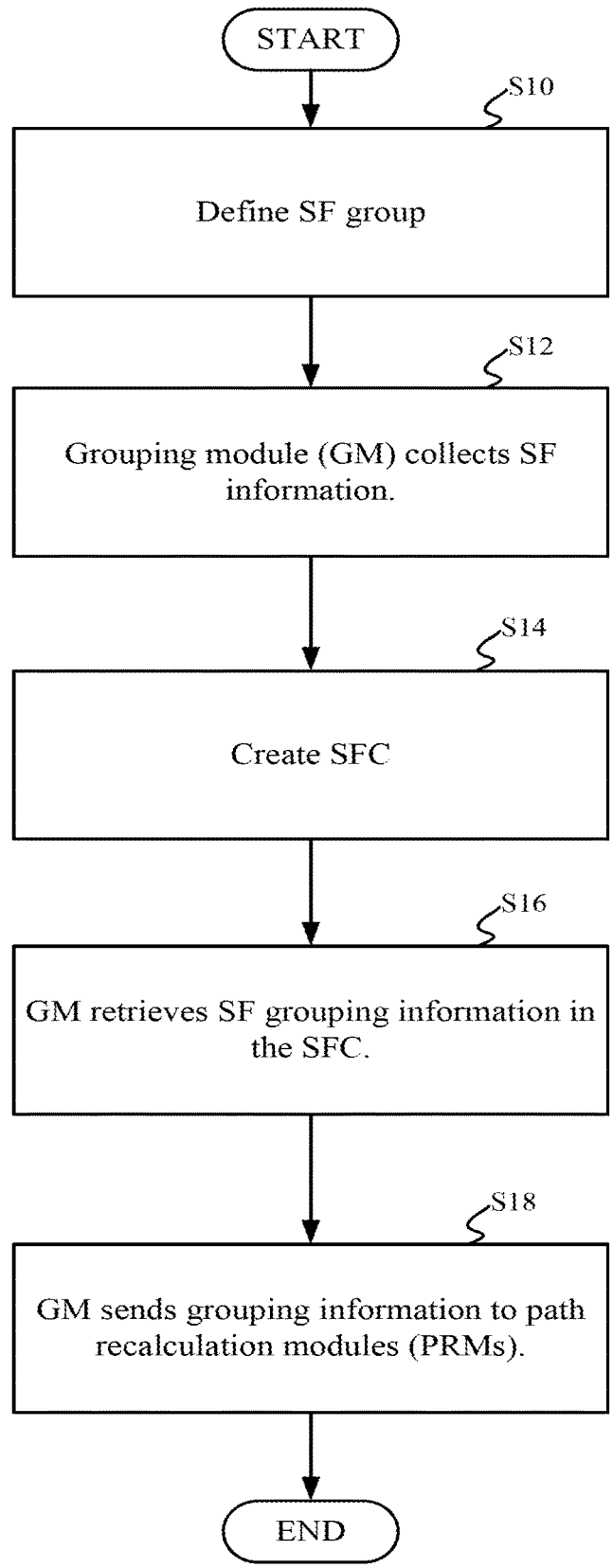
FIG. 2 is an exemplary operation flowchart of an exemplary embodiment of a grouping module (GM) of the disclosure.

With reference to FIG. 2, the GM 500 defines one or more SF groups (step S10). For example, the GM 500 in the SFC controller 100 may generate definition of one or more SF groups through a computerized automation process or a machine learning based categorization process. Alternatively, the GM 500 may passively receive and store definition of one or more SF groups from an administrative user. The GM 500 collects SF information for further categorization of the SFs (step S12). For example, the SF information collected in S12 may comprise function description of SFs, events occurs in the SFs, packets processing history, and others. The GM 500 creates a SFC (step S14), retrieves (step S16) and sends definition of SF groups associated with the SFC to PRMs 610, 620, 630, and 640 in the SFFs (step S18). Each of the PRMs 610, 620, 630, and 640 stores the definition of SF groups.

The classifier 200 may initiate a SFP as a more specific instance of the SFC created in step S14. For example, the classifier 200 may initiate an first exemplary SFP comprising a ordered set of the SFs 411, 412, 421, 422, 431, 432, and 441 as an instance of the SFC. Each of the SFFs 310, 320, 330, and 340 may receive and route packets of the SFC to the SFs according to the SFP.

Figure 3:
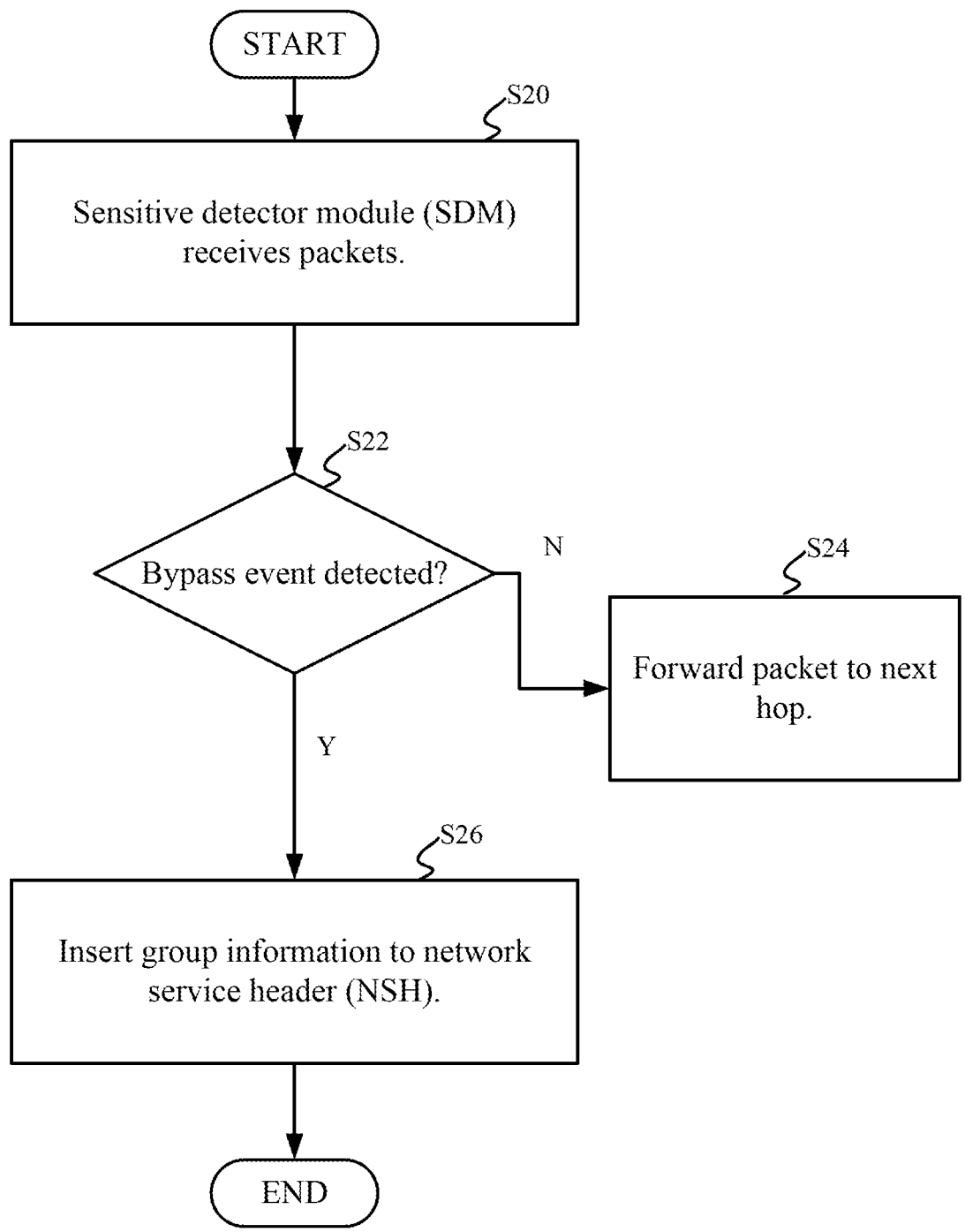
FIG. 3 is an exemplary operation flowchart of an exemplary embodiment of a sensitive detector module (SDM) of the disclosure.
Figure 5:
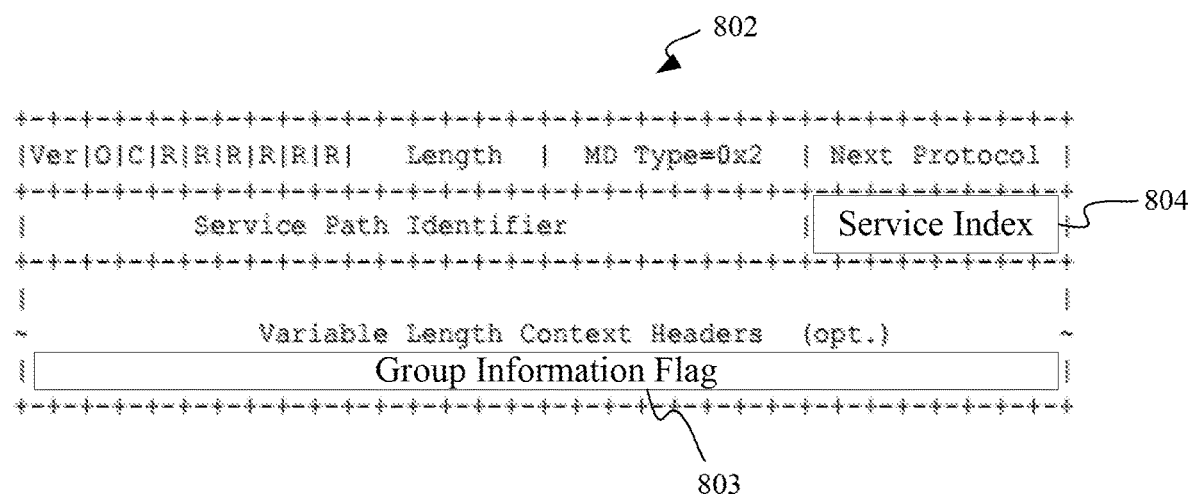
FIG. 5 is a schematic diagram illustrating an exemplary embodiment of a modified SFC packet header of the disclosure.

With reference to FIG. 3, a sensitive detector module (SDM) in an SF, referred to as an exemplary SF, receives a packet, such as the first packet, classified for the exemplary SFP (step S20), and detects whether a bypass event occurs in the exemplary SF (step S22). In other words, the SDM in the exemplary SF determines whether the SF bypass processing of the first packet (step S22). If no bypass event occurs in the SF, the SDM forwards the first packet to a next hop, such as a subsequent SF or a subsequent SFF (step S24). If a bypass event is detected in the SF, the SDM modifies a network service header (NSH) of the first packet to further bypass one or more subsequent service functions arranged subsequent to the exemplary SF in the exemplary SFP of the first packet (step S26). With reference to FIG. 5, the SDM may insert a group information flag 803 in the NSH 802 of the first packet. The SF applies the method in FIG. 3 to subsequent packets of the first exemplary SFP.

Figure 4:
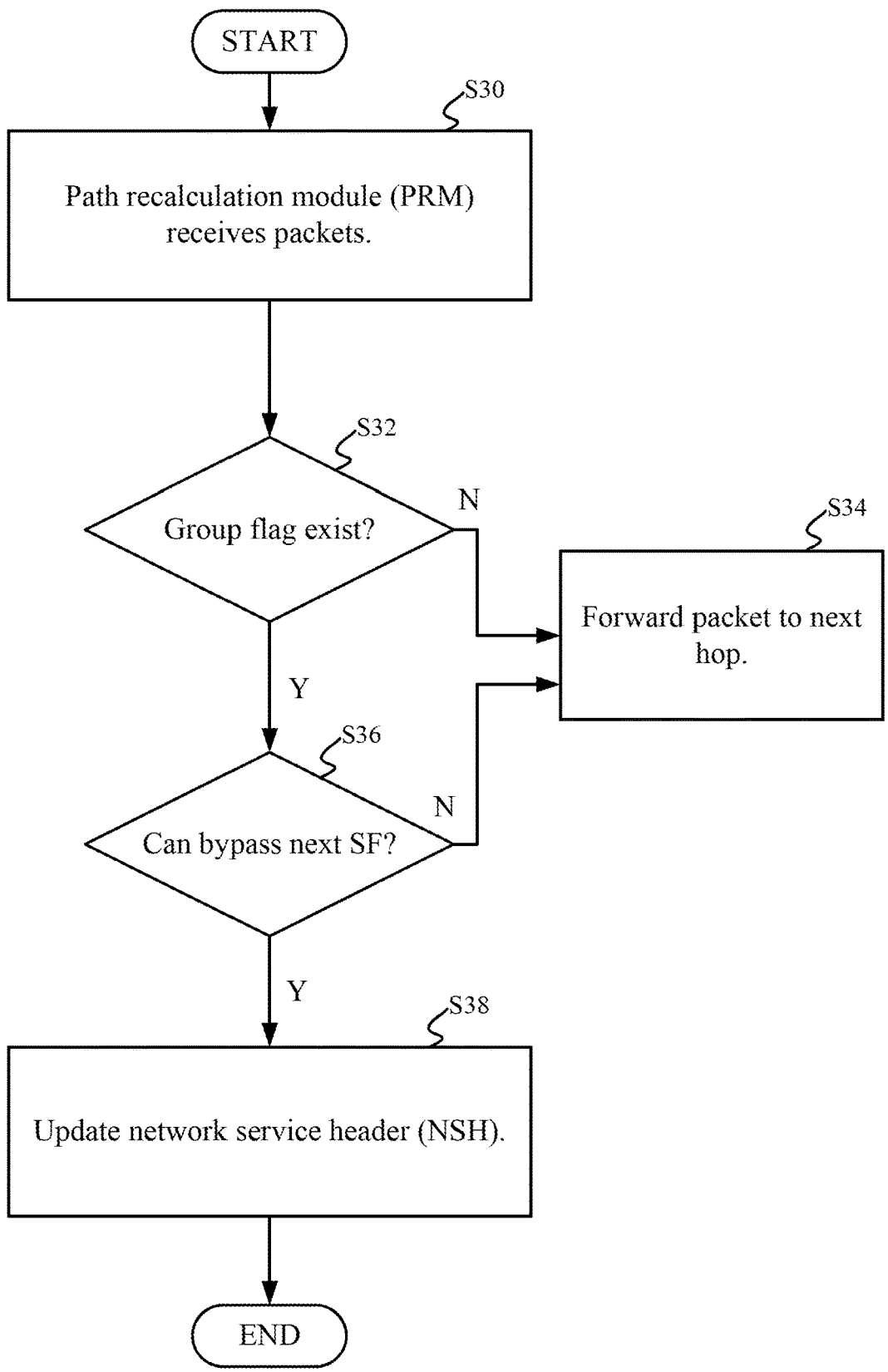
FIG. 4 is an exemplary operation flowchart of an exemplary embodiment of a path recalculation module (PRM) of the disclosure.

With reference to FIG. 4, a PRM in an SFF, referred to as an exemplary SFF, receives a packet, such as the first packet, classified for the exemplary SFP, such as the first exemplary SFP (step S30) and determines whether the packet includes a group information flag in the NSH, such as the flag 803 in the NSH 802 (step S32). If the packet does not include any group flag in the NSH, the exemplary SFF forwards the packet to a next hop, such as a subsequent SF or a subsequent SFF (step S34). If the packet include a group flag in the NSH, such as the flag 803 in the NSH 802, the exemplary SFF determines whether to bypass processing of the packet by the next SF in the exemplary SFP (step S36). The exemplary SFF determines whether to bypass processing of the packet by the next SF in the exemplary SFP based on whether the exemplary SF in step S26 and the next SF belongs to the same group according to the definition of SF groups in step S18. If the exemplary SF in step S26 and the next SF belongs to the same group, the exemplary SFF determines to bypass processing of the packet by the next SF in the exemplary SFP. If the exemplary SF in step S26 and the next SF do not belong to the same group, the exemplary SFF determines not to bypass processing of the packet by the next SF in the exemplary SFP. If determining not to bypass processing of the packet by the next SF in the exemplary SFP, the exemplary SFF forwards the packet to a next hop, such as a subsequent SF or a subsequent SFF (step S34). If determining to bypass processing of the packet by the next SF in the exemplary SFP, the exemplary SFF updates the NSH of the packet to bypass processing of the packet by the next SF (step S38). With reference to FIG. 5, the SFF may modifies the service index 804 in the NSH 802 to a SF which belong to another SF group different from the exemplary SF in step S26. The SFF applies the method in FIG. 4 to subsequent packets of the first exemplary SFP.

Even though the flag 803 in the NSH 802 is utilized as an example for communication between SFs and SFFs, other fields in the NSH, such as metadata, or other channels may be utilized by SFs and SFFs to reveal the bypass event and the group information flag, and thus to achieve in-band control signaling between SFs and SFFs. Alternatively, out of band control signaling between SFs and SFFs may also be utilized. For example, an SF may report a bypass event associated with a packet in a flow to the SFC controller 100. The SFC controller 100 facilitates the SFFs to bypass SFs belonging to the same SF group which does not provides functional service to packets of the flow through out of band control signaling.

Figure 6:
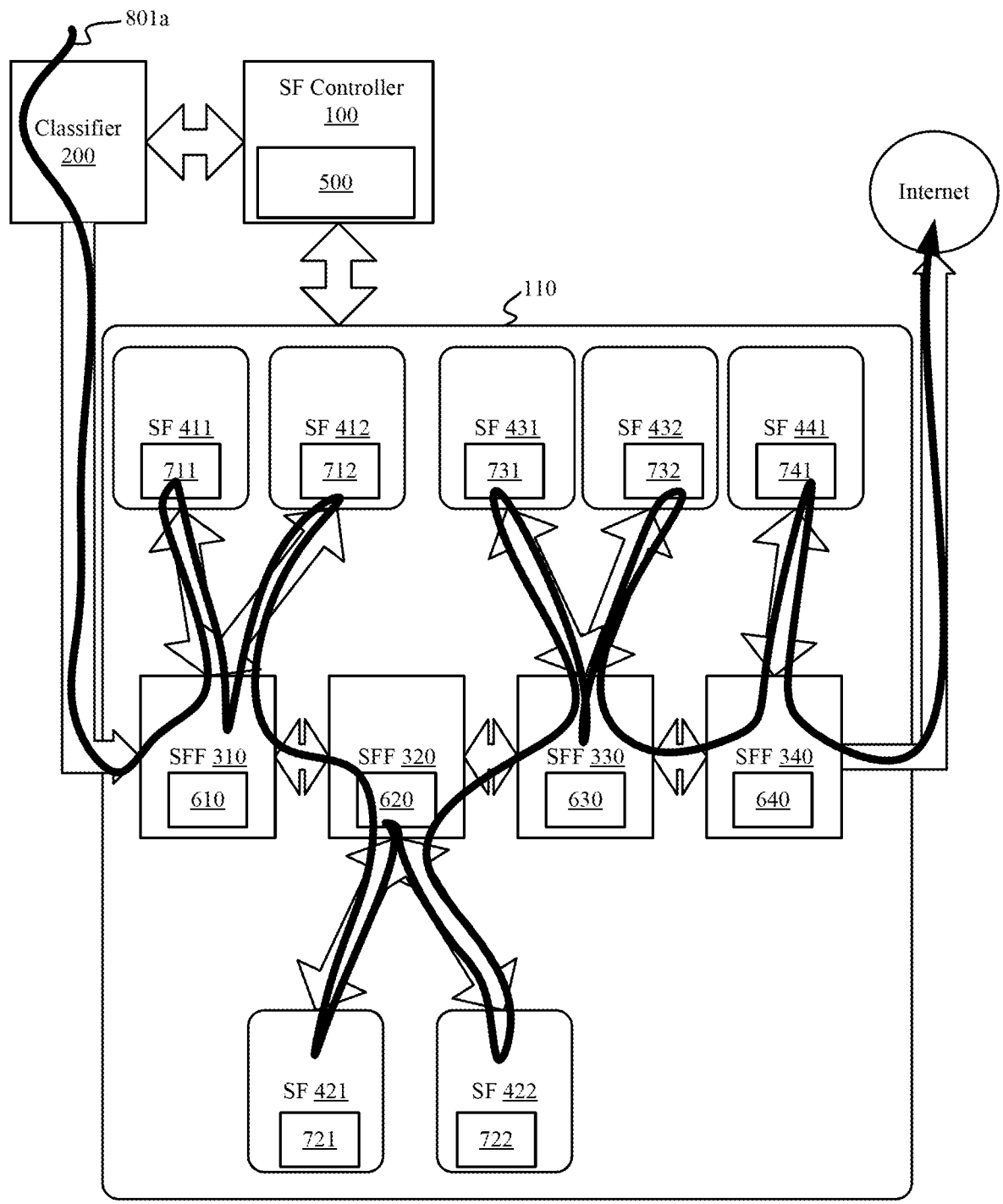
FIG. 6 is a schematic diagram illustrating a path of an exemplary SFC packet flow.

With reference to FIG. 6, for example, the classifier 200 allocates the first exemplary SFP comprising a ordered set of the SFs 411, 412, 421, 422, 431, 432, and 441 for a flow 801a of packets. Before utilization of the packet forwarding method of the disclosure, packets in the flow 801a travel through the ordered set of the SFs 411, 412, 421, 422, 431, 432, and 441. An example of the definition of the SFs is shown in Table 1:

TABLE 1

| Group | SF |
| --- | --- |
| Firewall | SF 411 |
| Wide area network (WAN) and TCP optimization | SF 412 |
| Type one video optimizer | SF 421 |
| Type two video optimizer | SF 422, SF 431, and SF 432 |
| Header enrichment | SF 441 |

Figure 7:
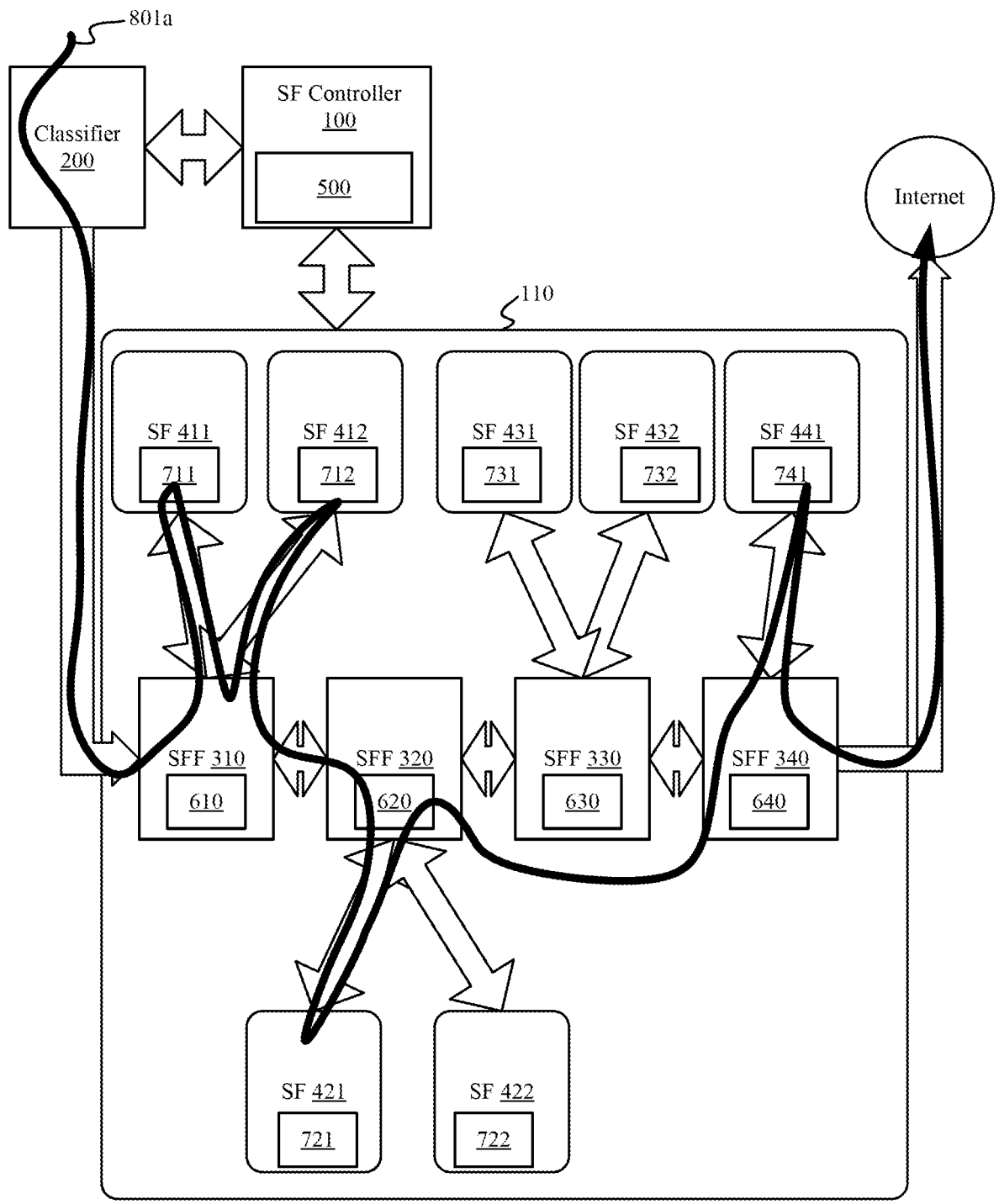
FIG. 7 is a schematic diagram illustrating a recalculated path of an exemplary SFC packet flow.

With reference to FIG. 7, after utilization of the packet forwarding method of the disclosure, packets in the flow 801a travel through the ordered set of the SFs 411, 412, 421, and 441. A first packet in the flow 801a travels through the classifier 200, the SFF 310, the SF 411, the SF 412, the SFF 320, the SF 421, and the SF 422.

If SF 421 is took as an example, the SDM 721 in the SF 421 receives the first packet and detects whether a bypass event occurs in the SF 421. If no bypass event occurs in the SF 421, that is, the SF 421 actually provides functional service of the type one video optimizer to the first packet, the SDM forwards the first packet to SFF 320 and SF 422. The SDM 722 in the SF 422 receives the first packet and detects whether a bypass event occurs in the SF 422. In a condition that a bypass event is detected in the SF 422, that is, the SF 422 actually does not provide functional service of the type two video optimizer to the first packet, the SDM 722 modifies a network service header (NSH) of the first packet to further bypass one or more subsequent service functions arranged subsequent to the SF 422 in the first exemplary SFP of the first packet.

If SFF 320 is took as an example, the PRM 620 in SFF 32 receives the first packet from the SF 422 and determines whether the packet includes a group information flag in the NSH, such as the flag 803 in the NSH 802. If the packet does not include any group flag in the NSH, the exemplary SFF forwards the packet to a next hop, such as the SFF 330 and the SF 431. If the packet include a group flag in the NSH, such as the flag 803 in the NSH 802, the exemplary SFF determines whether to bypass processing of the packet by the next SF 431 in the first exemplary SFP (step S36). The exemplary SFF determines whether to bypass processing of the packet by the next SF 431 in the exemplary SFP based on whether the SF 422 and SF 431 belongs to the same group according to the definition of SF groups in Table 1. As shown in Table 1, the SFs 422, 431, and 432 belong to the same group of "Type two video optimizer", the SFF 320 determines to bypass processing of the packet by the SF 431 and the SF 432 in the first exemplary SFP. The SFF 320 updates the NSH of the packet to bypass processing of the packet by the next SF (step S38). With reference to FIG. 5, the SFF may modifies the service index 804 in the NSH 802 to the SF 441 which belong to another SF group different from the SF 422. The first packet bypassing the SFF 330, the SFs 431 and 432 is directly forwarded to the SFF 340 and the SF 441. The SFs and the SFFs apply the method to subsequent packets in the flow 801a of the first exemplary SFP to improve efficiency of processing the SFC for the flow 801a.

Figure 8:
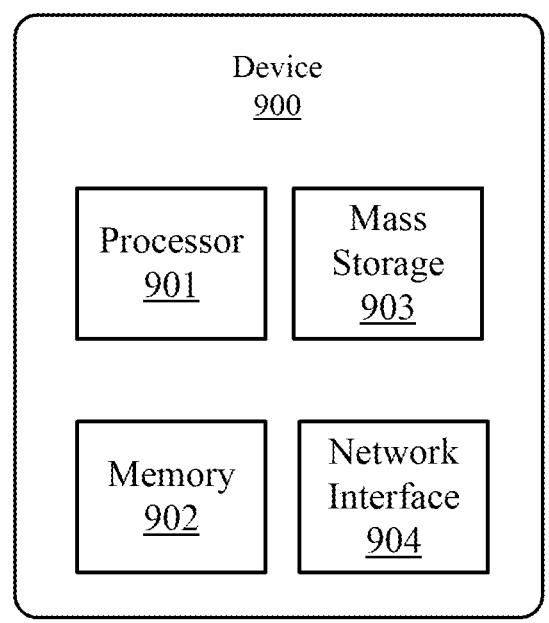
FIG. 8 is a schematic diagram illustrating an electronic device operable to execute a SFC packet forwarding method of the disclosure.

With reference to FIG. 8, the packet forwarding method of the disclosure may be implemented by computer program stored in storage media, such mass storage 903 in a device 900. The computer program implementing the packet forwarding method when loaded to a memory 902 by a processor 901 directs the processor 901 in the device 900 to execute the packet forwarding method. The processor 901 communicates with other entities through a networking interface 904. Each of the SFC controller, classifier, SFs, and SFFs in FIG. 1 may implemented as an exemplary embodiment of the device 900. Alternative, all of any combination of the SFC controller, classifier, SFs, and SFFs in FIG. 1 may simultaneously run in one or more virtual machines in the device 900 or a plurality of exemplary embodiments of the device 900.

The disclosed method reacts to SF events more promptly by recalculating a more streamlined path for a packet flow of a SFP and does not relying on an SFC classifier to further classifying the SFP into a plurality of sub-divided SFP. SFs and SFFs collaborate to serve a SFC packet flow and bypass SFs belonging to the same SF group which does not provides functional service to packets of the flow. At least one member of the SF group bypasses processing a packet of the flow, triggers and reports a bypass event using a group information flag. An SFF identifies the bypass event and accordingly redirects packets of the flow.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A packet forwarding method executable by an electronic device, comprising:
   receiving a first packet classified for a service function path (SFP) at a first service function (SF) in the service function path;
   determining whether a bypass event associated with the first packet and the first service function is detected;
   inserting group information of the first service function into a header of the first packet in a condition that the bypass event is detected;
   transmitting the first packet comprising the group information to a service function forwarder (SFF); and
   modifying a service index in the service function chain encapsulation of the first packet to bypass one or more subsequent service functions arranged subsequent to the first service function in the service function path of the first packet in a condition that the first packet comprises the group information.

2. The packet forwarding method of claim 1, wherein the first service function and the one or more subsequent service functions arranged subsequent to the first service function in the service function path belong to a same service function group.

3. The packet forwarding method of claim 1, wherein the modifying the header of the first packet comprises:
   modifying the header of the first packet to bypass a subsequent service function forwarder connecting the one or more subsequent service functions arranged subsequent to the first service function in the service function path of the first packet in a condition that the bypass event is detected.

4. A packet forwarding device, comprising:
   a memory operable to store a sensitive detector module;
   a processor operable to load the sensitive detector module and perform a packet forwarding method comprising:
   receiving a first packet classified for a service function path (SFP) at a first service function (SF) in the service function path;
   determining whether a bypass event associated with the first packet and the first service function is detected;
   inserting group information of the first service function into a header of the first packet in a condition that the bypass event is detected;
   transmitting the first packet comprising the group information to a service function forwarder (SFF); and
   modifying a service index in the service function chain encapsulation of the first packet to bypass one or more subsequent service functions arranged subsequent to the first service function in the service function path of the first packet in a condition that the first packet comprises the group information.

* * * * *